United States Patent [19]
Yoshida et al.

[11] Patent Number: 4,812,154
[45] Date of Patent: Mar. 14, 1989

[54] METHOD FOR PRODUCING GLASS PREFORM FOR OPTICAL FIBER

[75] Inventors: Kiminobu Yoshida; Akio Shiomi; Kazuhisa Watanabe, all of Yokohama, Japan

[73] Assignee: Sumitomo Electric Industries, Ltd., Osaka, Japan

[21] Appl. No.: 106,602

[22] Filed: Oct. 13, 1987

[30] Foreign Application Priority Data

Oct. 15, 1986 [JP] Japan .................. 61-243271

[51] Int. Cl.$^4$ .............................................. C03B 37/012
[52] U.S. Cl. ......................................... 65/3.11; 65/3.2
[58] Field of Search .................... 65/3.11, 3.12, 3.2, 65/13, 18.2, DIG. 16, 900

[56] References Cited

U.S. PATENT DOCUMENTS

| | | | |
|---|---|---|---|
| 4,518,407 | 5/1985 | Black | 65/3.12 |
| 4,602,926 | 7/1986 | Harrison | 65/13 |
| 4,668,263 | 5/1987 | Yokota | 65/3.11 |

FOREIGN PATENT DOCUMENTS

| | | | |
|---|---|---|---|
| 59-06261 | 2/1984 | Japan | 65/3.2 |
| 2037273 | 7/1980 | United Kingdom | 65/3.12 |

Primary Examiner—Kenneth M. Schor
Attorney, Agent, or Firm—Cushman, Darby & Cushman

[57] ABSTRACT

A method for producing a glass preform for an optical fiber which comprises the steps of inserting a glass rod from one end of a glass tube while supplying a gas from the other end of the glass tube, flowing the gas through a clearance between the glass rod and the glass tube, exhausting the gas from said one end of the glass tube to outside of the glass tube, and heating and collapsing the glass tube on the glass rod to integrate them and to form the glass preform, which method yields a glass preform from which an optical fiber having improved strength and low attenuation of light is produced.

5 Claims, 1 Drawing Sheet

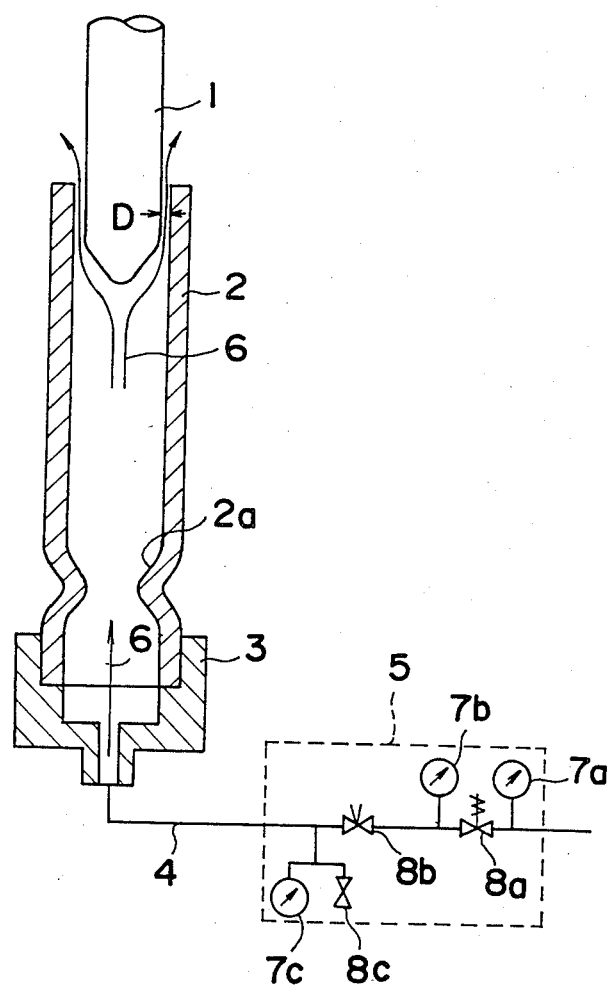

METHOD FOR PRODUCING GLASS PREFORM FOR OPTICAL FIBER

BACKGROUND OF THE INVENTION

1. Field of the Invention

The present invention relates to a method for producing a glass preform for use in the production of an optical fiber. More particularly, it relates to a rod-in-tube method for producing a glass preform from which an optical fiber having improved strength and low attenuation of light is produced.

2. Description of the Prior Art

In a rod-in-tube method for producing a glass preform for use in the production of an optical fiber, a quartz glass rod which forms a core part of the glass preform and has a desired refractive index profile is preferably produced by the Vapor Phase Axial Deposition method (hereinafter referred to as the "VAD" method) and inserted coaxially into a glass tube of pure quartz. Then, an outer surface of the glass tube is heated by an oxyhydrogen flame to collapse the glass tube, and the glass tube and the glass rod are integrated so as to produce the glass preform for the optical fiber. Before the glass rod is inserted into the glass tube, an inner diameter of the glass tube and/or the diameter of the glass rod are preferably modified by heating, since the less the clearance is between the glass tube and the glass rod then, the less the eccentricity is of the core after the collapse.

When the clearance between the glass rod and the glass tube is extremely narrow, it is extremely difficult to prevent direct contact of the glass rod to the glass tube during insertion of the glass rod into the glass tube, which produces minute flaws on either or both of an inner surface of the glass tube and an surface of the glass rod. The flaws increase the attenuation of light and/or decrease significantly the strength of the resulting optical fiber. Particularly, when the flaws are large, the optical fiber is often broken in a subsequent drawing step of the glass preform, and a large diffusion loss of transmitted light occurs by the flawed part.

SUMMARY OF THE INVENTION

An object of the present invention is to provide a rod-in-tube method for producing a glass preform for use in the production an optical fiber, which can maintain a narrow clearance between a glass rod and a glass tube without direct contact of them during insertion of the glass rod into the glass tube.

This and other objects of the present invention are achieved by a method for producing a glass preform for an optical fiber which comprises the steps of inserting a glass rod from one end of a glass tube while supplying a gas from the other end of the glass tube, flowing the gas through a clearance between the glass rod and the glass tube, exhausting the gas from said one end of the glass tube to outside of the glass tube, and heating and collapsing the glass tube on the glass rod to integrate them and to form the glass preform.

Thereby, the glass rod can be inserted into the glass tube without direct contact of them.

BRIEF DESCRIPTION OF THE DRAWING

The FIGURE schematically shows the method for producing the glass preform according to the present invention.

DETAILED DESCRIPTION OF THE INVENTION

The gas to be supplied is any gas which does not contaminate the interface between the glass rod and the glass tube and is not accompanied by an undesirable reaction. For example, a highly pure gas such as clean dry air and nitrogen is supplied.

A gas pressure in the glass tube varies with various factors such as the position and weight of the glass rod and the distance of clearance between the glass rod and glass tube.

Before the insertion of the glass rod into the glass tube is commenced, the gas pressure in the glass tube is $\alpha$ mmH$_2$O larger than the circumferential pressure. It varies with factors such as a capacity of a pressure regulator and a flow resistance. As the insertion proceeds, the gas pressure as well as a flow resistance between the glass rod and the glass tube naturally increases. When the gas pressure balances with the weight of the glass rod, it reaches the maximum pressure and the glass rod floats. To prevent the glass rod from rapidly dropping towards the bottom of the glass tube, the glass rod must be floated in any position of the glass tube. At the time of the balance, the gas pressure can be calculated according to the formula: [(Weight of the glass rod)−(Retention force caused by the viscosity of the gas flow between the glass rod and the glass tube)]÷(Cross sectional area of the glass tube). Since the retention force is negligible, the gas pressure may be calculated according to the formula: (Weight of the glass rod)÷(Cross sectional area of the glass tube). If the balance is broken, the glass rod is further inserted.

For example, when the glass rod has a diameter of 10 mm and a length of 1,000 mm, the gas pressure P necessary to float the glass rod is calculated as follows:

$\gamma$ (density)=2.7 g/cm$^3$
W (rod weight)=$(\pi d^2/4) \times \gamma \times 1$=212 g
A (cross sectional area)=0.8 cm$^2$
P=W/A=265 g/cm$^2$ For example, when the glass rod is of 10 mm in diameter and 300 mm, 500 mm, 1000 mm or 2000 mm in length, it is floated at the gas pressure of larger than 0.05, 0.13, 0.27 or 0.5 kg/cm$^2$ plus the circumferential pressure.

At the end of insertion of the glass rod, the gas pressure may be decreased to the circumferential pressure.

The clearance between the glass rod and the glass tube is usually from 0.03 to 1.0 mm, preferably from 0.03 to 0.05 mm.

The gas is supplied from one end of the glass tube as a counter flow against the insertion direction of the glass rod, flowed through the clearance between the glass tube and the glass rod, and then exhausted from the other end of the glass tube to form a gas flow in the clearance. A flow rate of the gas flow is so adjusted as to increase flow resistance of the gas and increase gas pressure.

If the inserted glass rod leans to a part of the inner wall of the glass tube, a force which pushes it back to the center of the glass tube is generated by the gas flow. Thus, the glass rod can be inserted without touching the inner wall of the glass tube since the gas pressure is evenly generated in all circumferential directions of the clearance.

The method for producing the glass preform for the optical fiber according to the present invention will be illustrated by making reference to the accompanying drawing, in which the FIGURE shows one embodiment of the method according to the present invention.

A glass rod 1 is produced by a conventional method such as the VAD method to have a refractive index profile required for the core part of the glass preform. A glass tube 2 may be made of pure quartz glass which optionally contains an additive to decrease a refractive index. The glass tube 2 is supported vertically, and the glass rod 1 is inserted into the glass tube 2 from the upper end of the tube 2 while keeping a coaxial relation with the tube. Before the insertion of the glass rod in the glass tube, a diameter of the glass rod 1 and an inner diameter of the glass tube 2 are preferably adjusted such that the clearance between the inserted glass rod 1 and the glass tube 2 is made as small as possible to minimize the eccentricity of the core in the produced glass preform. A connecting device 3 is attached to the lower end of the glass tube 2, and a gas supplying device 5, which supplies the highly pure gas, is connected to the connecting device 3 through a pipe 4.

The gas supplying device 5 is also connected to a gas-source (not shown) containing the highly pure gas under a specific pressure, and the pressure of the gas-source can be monitored by a pressure gauge 7a. The gas from the gas-source is decompressed by a pressure regulator 8a, adjusted to a suitable pressure with monitoring said pressure by a pressure gauge 7b, and fed to the gas supplying device 5.

A flow rate of gas from the gas supplying device 5 to the glass tube 2 is adjusted by a flow-rate adjusting valve 8b, and the gas pressure on an output side of the flow-rate adjusting valve 8b can be monitored by a pressure gauge 7c. The flow rate of the gas in the glass tube 2 can be also adjusted by an exhausting valve 8c which is provided on the output side of the flow-rate adjusting valve 8b.

In the FIGURE, to maintain the coaxial relation between the glass rod 1 and the glass tube 2 when the glass rod 1 reaches the lower end of the glass tube 2, the lower end of the glass rod 1 is conically shaped and the lower end of the glass tube 2 is provided with a constricted part 2a to form the conical inner surface for receiving the conical lower end of the glass rod 1.

In the method for producing the glass preform for the optical fiber shown in the FIGURE, the glass tube 2 is substantially vertically positioned, and a gas flow 6 is fed in the glass tube 2 via the pipe 4 and the connecting device 3 attached to the lower end of the glass tube 2. The gas flow is adjusted at a desirable flow rate by the flow-rate adjusting valve 8b in the gas supplying device 5.

Then, the glass rod 1 is gradually inserted into the tube 2 from the upper end of the glass tube 2 by an operation of a supporting and inserting device (not shown) while maintaining the coaxial position of them. As the glass rod 1 is gradually inserted in the glass tube 2, a flow resistance of the gas flow 6, which flows in the clearance between the glass rod 1 and the glass tube 2, increases and a pressure of the gas flow 6 increases. The pressure keeps the clearance between the glass rod 1 and the glass tube 2 at a certain constant distance D in the circumferential direction. When the glass rod 1 approaches to a part of the inner wall of the glass tube 2, the distance of clearance near said part decreases and the flow rate of the gas increases. Consequently, the pressure increases, and power is generated to push the glass rod 1 to the coaxial position. Such movement of the glass rod 1 automatically keeps the distance D between glass rod 1 and glass tube 2 constant. Thus, the glass rod 1 is inserted in the glass tube without touching the inner wall of the glass tube 2.

The insertion of the glass rod 1 into the glass tube 2 is initially carried out by the aid of the supporting and inserting device (not shown). As the insertion proceeds, a gravitational force due to the weight of the glass rod 1 and the gas pressure, namely resistance by the gas flow 6 is balanced. At such position, supporting the glass rod 1 by the supporting and inserting device is discontinued. When the flow rate of the gas flow 6 from the gas supplying device 5 is gradually decreased by adjusting the flow-rate adjusting valve 8b or the exhausting valve 8c, the glass rod 1 gradually descends in the glass tube 2 due to its weight. Since the lower end of the glass rod 1 has the conical shape and the inner surface of the constricted part 2a of the glass tube 2 also has the conical shape, the glass rod 1 and the glass tube 2 remain coaxially when the lower end of the glass rod 1 contacts the lower end of the glass tube 2.

Although the manual operation has been explained in connection with the FIGURE, the gas flow from the gas supplying device 5 may be easily adjusted by an automatic controlling system.

Then, the composite glass rod and glass tube are heated by a conventional manner, for example, by the oxyhydrogen flame so that the glass tube is melted to collapse and they are integrated to form the glass preform.

According to the method of the present invention, the glass rod which forms the core part of the glass preform can be inserted in the glass tube which forms a cladding part of the glass preform while maintaining a significantly small clearance between them and without contacting them to each other. Accordingly, since the glass preform has substantially no flaw at the interface between the core and the cladding, the optical fiber which is produced by drawing such glass preform has no flaw therein, so that the attenuation of the light transmitted therethrough is decreased significantly and its strength is increased. While the glass preform is drawn to produce the optical fiber, less breakage occurs than the conventional techniques since less flaws are formed on the interface between the core and cladding parts, and therefore productivity of the optical fiber is improved.

What is claimed is:

1. A method for producing a glass preform for an optical fiber which comprises the steps of:
inserting a glass rod from one end of a glass tube into the tube while supplying a gas from the other end of the glass tube, flowing the gas through a clearance between the glass rod and the glass tube, exhausting the gas from said one end of the glass tube to outside of the glass tube so that the rod is centered within the tube via (a) the flowing gas and (b) a conically shaped end of the rod sliding into a mating relation with a constriction in the tube, and
heating and collapsing the glass tube on the glass rod to integrate them and to form the glass preform wherein the rod forms a core part of the preform and the tube forms a cladding part of the preform.

2. The method according to claim 1, wherein said gas is clean dry air or nitrogen.

3. The method according to claim 1, wherein said glass tube is supported vertically, and the glass rod is inserted from an upper end of the glass tube.

4. The method according to claim 3, wherein said glass rod has a conically shaped lower end which is inserted into the glass tube.

5. The method according to claim 3, wherein a lower end of the glass tube has a constricted part.

* * * * *